United States Patent
Jeannette et al.

(10) Patent No.: US 7,281,211 B2
(45) Date of Patent: Oct. 9, 2007

(54) AUTOMATED METHOD, SYSTEM, AND SOFTWARE FOR TRANSFORMING DATA BETWEEN EXTENSIBLE MARKUP LANGUAGE FORMAT AND ELECTRONIC DATA INTERCHANGE FORMAT

(75) Inventors: James Jeannette, White Lake, MI (US); Joseph Dupree, West Bloomfield, MI (US); Jeffery R. Eck, Poolesville, MD (US)

(73) Assignee: GXS, Inc., Gaithersburg, MD (US)

( * ) Notice: Subject to any disclaimer, the term of this patent is extended or adjusted under 35 U.S.C. 154(b) by 988 days.

(21) Appl. No.: 10/023,857

(22) Filed: Dec. 21, 2001

(65) Prior Publication Data

US 2003/0121001 A1 Jun. 26, 2003

(51) Int. Cl.
G06F 15/00 (2006.01)
G06F 17/00 (2006.01)

(52) U.S. Cl. ...................... 715/523; 715/513
(58) Field of Classification Search ........... 715/513, 715/523
See application file for complete search history.

(56) References Cited

U.S. PATENT DOCUMENTS

| | | | |
|---|---|---|---|
| 5,367,664 A * | 11/1994 | Magill et al. ................. 714/16 |
| 5,557,780 A | 9/1996 | Edwards et al. | |
| 5,909,570 A * | 6/1999 | Webber ......................... 703/13 |
| 5,970,490 A * | 10/1999 | Morgenstern ................. 707/10 |
| 6,226,675 B1 | 5/2001 | Meltzer et al. | |
| 6,408,303 B1 * | 6/2002 | Richards ..................... 707/102 |
| 6,418,400 B1 * | 7/2002 | Webber ........................ 703/22 |
| 6,490,718 B1 * | 12/2002 | Watters ....................... 717/100 |
| 6,678,867 B2 * | 1/2004 | Fong et al. ................. 715/523 |
| 6,681,223 B1 * | 1/2004 | Sundaresan ..................... 707/6 |
| 6,742,001 B2 * | 5/2004 | Ripley ...................... 707/104.1 |
| 6,763,353 B2 * | 7/2004 | Li et al. .......................... 707/4 |
| 6,772,180 B1 * | 8/2004 | Li et al. ....................... 715/513 |
| 6,820,135 B1 * | 11/2004 | Dingman et al. ........... 709/246 |
| 6,823,495 B1 * | 11/2004 | Vedula et al. ................ 715/805 |
| 6,874,141 B1 * | 3/2005 | Swamy et al. ............... 717/144 |
| 7,114,123 B2 * | 9/2006 | Chen et al. .................. 715/513 |
| 2002/0026461 A1 * | 2/2002 | Kutay et al. ................. 707/523 |
| 2002/0035583 A1 * | 3/2002 | Price et al. .................. 707/513 |
| 2002/0059566 A1 * | 5/2002 | Delcambre et al. ......... 717/146 |
| 2002/0083099 A1 * | 6/2002 | Knauss et al. .............. 707/513 |
| 2002/0099735 A1 * | 7/2002 | Schroeder et al. .......... 707/513 |
| 2002/0111964 A1 * | 8/2002 | Chen et al. .................. 707/513 |
| 2002/0120641 A1 * | 8/2002 | Rozek et al. ................ 707/500 |

(Continued)

OTHER PUBLICATIONS

"Welcome to INET'99: The Internet Global Summit", Conference Announcement, San Jose, CA, Jun. 22-25, 1999, p. 1 (downloaded from: www.isoc.org/inet99/confserv/).*

(Continued)

Primary Examiner—Cam-Y Truong
Assistant Examiner—Robert Stevens
(74) Attorney, Agent, or Firm—Foley & Lardner LLP

(57) ABSTRACT

A computer implemented method, apparatus and software for automatically transforming data between a self-describing markup language format and an Electronic Data Interchange (EDI) format. For generating EDI documents, a standard data model with EDI related data is received. Data definitions for the self-describing markup language are generated. The generated data definitions are used to generate self-describing markup language data. An EDI document is automatically created based on the self-describing markup language data.

7 Claims, 5 Drawing Sheets

U.S. PATENT DOCUMENTS

| | | | |
|---|---|---|---|
| 2002/0129059 A1* | 9/2002 | Eck | 707/513 |
| 2002/0143823 A1* | 10/2002 | Stevens | 707/523 |
| 2002/0143824 A1* | 10/2002 | Lee et al. | 707/523 |
| 2003/0014270 A1* | 1/2003 | Qureshi et al. | 705/1 |
| 2003/0018666 A1* | 1/2003 | Chen et al. | 707/513 |

OTHER PUBLICATIONS

Smith, Graham R., "Reshaping the EDI Business Landscape Utilizing XML", INET'99, San Jose, CA, Jun. 22-25, 1999, pp. 1-5 (downloaded from: www.isoc.org/inet99/Proceedings/li/li_htm).*

"<XML> on Wall Street: How XML is being Applied in Today's Financial Markets", Dec. 7, 2001, p. 1 (downloaded from: light-partners.com/xml/newsarchive/20011207b.htm).*

"Proposal for a UN Repository for XML/EDI", EEMA EDI Working Group, Jun. 29, 1998, pp. 1-6 (downloaded from: www.webarchive.org/web/19980629101518/http://www.edi-tie.nl/edifact/xml-edi_proposal_simac.htm).*

Raman, Dick, "Setting Up a UN Repository for XML/EDI", EEMA EDI Working Group, Mar. 4, 2000, pp. 1-7 (downloaded from: www.webarchive.org/web/20000304113933/http://www.edi-tie-nl/edifact/XML-EDIrepositorySetup.htm).*

"Business-to-Business (B2B) eMarketplaces: If you build them . . . Will They Come???", Industry White Paper, ACOM, Solutions, Long Beach, CA, Feb. 6, 2001, pp. 1-3 plus date page [4 pages total].*

Peat, Bruce, et al., "Introducing XML/EDI . . . the e-Business framework", The XML/EDI Group, Aug. 1997, pp. 1-14 (downloaded from: www.geocities.com/WallStreet/Floor/5815/start.htm?200511).*

"Autoline", Trademark Electronic Search System (TESS) results page, Trademark filed Dec. 4, 2000, 2 pages (downloaded from: http://tess2.uspto.gov/bin/showfield?f=doc&state=svpss2.4.2).*

Raman, Dick, "Proposal for a UN Repository for XML Tags Based on UN/EDIFACT", TRADE/CEFACT/1998/CRP.25, Sep. 14-16, 1998, pp. 1-4 (downloaded from: www.edi-tie.nl /edifact/98crp25.htm).*

Ray, Erik T., Learning XML: Guide to Creating Self-Describing Data, O'Reilly Publishing, ISBN 0-596-00046-4, Jan. 2001, (one page print out downloaded from www.oreilly.com/catalog/learnxml/chapter/ch02.html).*

* cited by examiner

AUTOMATED METHOD, SYSTEM, AND SOFTWARE FOR TRANSFORMING DATA BETWEEN EXTENSIBLE MARKUP LANGUAGE FORMAT AND ELECTRONIC DATA INTERCHANGE FORMAT

FIELD OF INVENTION

This invention relates generally to the field of automatically transferring data between formats and more particularly to a method, system and software for generating and receiving Electronic Data Interchange (EDI) documents by transforming data in self-describing markup language formats to or from various EDI public standard message formats.

BACKGROUND OF THE INVENTION

In current business practice, there is always a need for data transfer from one company to the next, whether the data transfer is for a sale, an exchange, or any of the other various types of data transfers related to business transactions. There is a need for a product that will allow an efficient transform of customer application data between their internal system format and an EDI format.

EDI was developed to support internal business-to-business communication for almost a quarter of a century. However, EDI is also relevant for all company-to-supplier retailer relationships, where the company can be an end-user, a manufacturer, a service organization such as a hospital or a hotel, a governmental organization or a virtual organization.

Companies sending and/or receiving EDI data are required to make sure that there were tailored software programs that map between the two types of data, one being EDI data and the other being data in the companies internal system formats. Such mapping is a complex process that requires extensive resources and is time consuming. Therefore, there is a need for more efficient automated tools to facilitate the mapping process.

SUMMARY OF INVENTION

In one aspect, the present invention provides a computer implemented method of automatically generating Electronic Data Interchange (EDI) documents comprising: receiving a standard data model comprising EDI related data; generating data definitions for a self-describing markup language corresponding to each transaction of the EDI related data; generating self-describing markup language data using a data definition for the self-describing markup language corresponding to an EDI transaction and corresponding application data related to EDI; and automatically generating an EDI document based on the self-describing markup language data.

In one aspect of the present invention, the step of generating data definitions comprises receiving user input of an EDI standard, a version of the standard, and a transaction set.

In one aspect of the present invention, the step of generating data definitions further comprises generating data definitions for the self-describing markup language, a data model to read in data, a data model to read out data, and a map component file.

In another aspect of the present invention, the generated EDI documents conform to, but are not limited to, an ANSI X12 standard and an UN EDIFACT standard.

In yet another aspect of the present invention, the self-describing markup language comprises eXtensible MarkUp Language (XML).

In one aspect, the present invention provides a system for automatically generating Electronic Data Interchange (EDI) documents, the system including: a standard data model comprising EDI related data; a first generator that generates data definitions for a self-describing markup language corresponding to each transaction of the EDI related data; a second generator that generates self-describing markup language data using a data definition for the self-describing markup language corresponding to an EDI transaction and corresponding application data related to the EDI; and a translator that automatically generates an EDI document based on the self-describing markup language data.

In another aspect, the present invention provides a computer readable data storage medium having program code recorded thereon that is executable by a computer for generating Electronic Data Interchange (EDI) documents, the program code configured to cause the computer to perform the following steps: receiving a standard data model comprising EDI related data; generating data definitions for a self-describing markup language corresponding to each transaction of the EDI related data; generating self-describing markup language data using a data definition for the self-describing markup language corresponding to an EDI transaction and corresponding application data related to EDI; and automatically generating an EDI document based on the self-describing markup language data.

In one aspect, the present invention provides a system for automatically generating Electronic Data Interchange (EDI) documents, the system including: means for receiving a standard data model containing EDI related data; means for generating data definitions for a self-describing markup language corresponding to each transaction of the EDI related data; means for generating self-describing markup language data using a data definition for the self-describing markup language corresponding to an EDI transaction and corresponding application data related to EDI; and means for automatically generating an EDI document based on the self-describing markup language data.

In another aspect of the present invention is a computer implemented method of automatically generating Electronic Data Interchange (EDI) documents including the steps of: receiving a standard data model containing EDI related data; receiving a manual entry of parameters related to an EDI document; generating data definitions for the self-describing markup language corresponding to each transaction of the EDI related data; generating self-describing markup language data using the data definition for the self-describing markup language corresponding to an EDI transaction and corresponding application data related to EDI; and automatically generating an EDI document based on the self-describing markup language data and the manual entry of parameters.

In another aspect of the present invention, a computer implemented method of automatically generating data in a self-describing markup language format from received EDI data is provided, comprising the steps of: receiving EDI data from a component; retrieving a self-describing markup language data definition corresponding to a transaction type of received EDI data; and automatically generating self-describing markup language data format based on the received EDI data and the self-describing markup language data definition.

In another aspect of the present invention, prior to the receiving EDI data from a component, the step is provided of generating data definitions corresponding to each transaction type.

In another aspect of the present invention, prior to the retrieving step, the step is provided of receiving user input of an EDI standard, a version of the standard, and a transaction set in generating the self-describing markup language data definition.

In another aspect of the present invention, the received EDI data conforms to, but is not limited to, an ANSI X12 standard and an UN EDIFACT standard.

In yet another aspect of the present invention, the generated self-describing markup language comprises eXtensible MarkUp Language (XML).

In another aspect of the present invention, a system is provided for automatically generating data in a self-describing markup language format from received EDI data, the system comprising: a component for transmitting EDI data; a retriever that retrieves a self-describing markup language data definition corresponding to a transaction type of received EDI data; and a translator that automatically generates a self-describing markup language format based on the received EDI data and the self-describing markup language data definition.

In another aspect of the present invention, a computer program product is provided having program code that is executable by a computer for generating data in a self-describing markup language format from received EDI data, the program code configured to cause the computer to perform the following steps: receiving EDI data from a component; retrieving a self-describing markup language data definition corresponding to a transaction type of received EDI data; and automatically generating a self-describing markup language data format based on the received EDI data and the self-describing markup language data definition.

In yet another aspect of the present invention, a system is provided for automatically generating data in a self-describing markup language format from received EDI data, the system comprising: means for receiving EDI data from a component; means for retrieving a self-describing markup language data definition corresponding to a transaction type of received EDI data; and means for automatically creating self-describing markup language data format based on the received EDI data and the self-describing markup language data definition.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
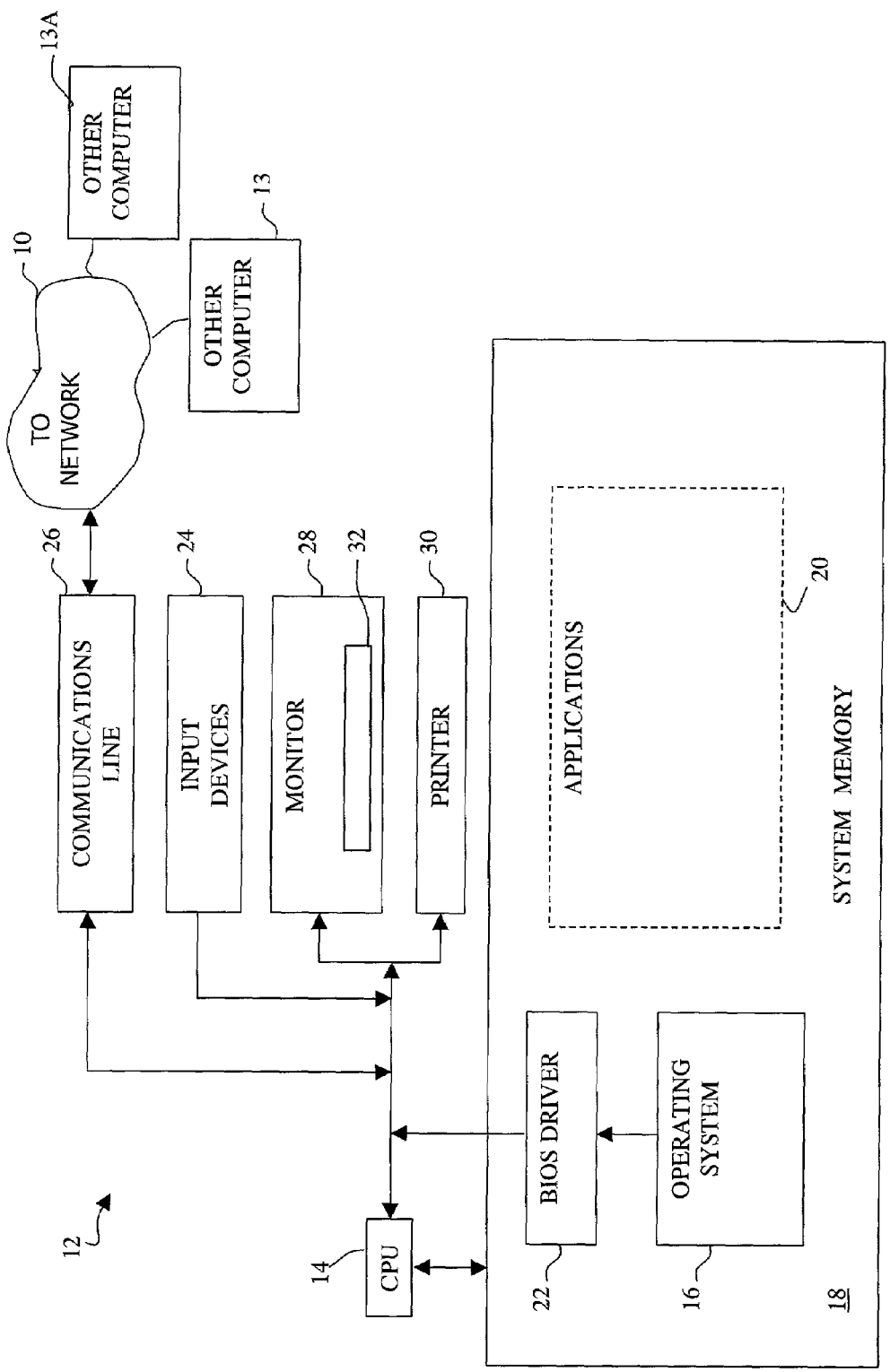
FIG. 1 is a schematic block diagram showing the components of a general purpose computer system connected to an electronic network.

With reference to the figures, FIG. 1 is a block diagram showing the components of a general purpose computer system 12 connected to an electronic network 10, such as a computer network. The computer network 10 can also be a public network, such as the Internet or Metropolitan Area Network (MAN), or other private network, such as a corporate Local Area Network (LAN) or Wide Area Network (WAN), or a virtual private network. As shown in the FIG. 1, the computer system 12 includes a central processing unit (CPU) 14 connected to a system memory 18. The system memory 18 typically contains an operating system 16, a BIOS driver 22, and application programs 20. In addition, the computer system 12 contains input devices 24 such as a mouse and a keyboard 32, and output devices such as a printer 30 and a display monitor 28.

The computer system generally includes a communications interface 26, such as an Ethernet card, to communicate to the electronic network 10. Other computer systems 13 and 13A may also be connected to the electronic network 10. One skilled in the art would recognize that the above system describes the typical components of a computer system connected to an electronic network. It should be appreciated that many other similar configurations are within the abilities of one skilled in the art and all of these configurations could be used with the methods of the present invention.

In addition, one skilled in the art would recognize that the "computer" implemented invention described further herein may include components that are not computers per se but include devices such as Internet appliances and Programmable Logic Controllers (PLCs) that may be used to provide one or more of the functionalities discussed herein. Furthermore, while "electronic" networks are generically used to refer to the communications network connecting the processing sites of the present invention, one skilled in the art would recognize that such networks could be implemented using optical or other equivalent technologies.

One skilled in the art would recognize that other system configurations and data structures and electronic/data signals could be provided to implement the functionality of the present invention. All such configurations and data structures are considered to be within the scope of the present invention.

Currently, eXtensible MarkUp Language (XML) models for creation of EDI documents are created using a software tool. This procedure requires a significant user effort for mapping purposes. This is because the data models representing XML syntax are considerably more complex than data models representing public EDI standards.

Once the XML model is created, the user needs to tediously map the data from one side to the other. A map component file to configure the environment, a run file to invoke the translation and an input file to test the translation also have to be manually created. Creating these other environment components and adding mapping rules to the XML and EDI data models requires considerable user time and effort.

There is also a way to create an XML dialect (XEDI from XML Solutions). That solution aligns to EDI transaction sets such that the user can map information to and from an EDI format and an XML format. However, this solution places a heavier burden on the mappers and integrators (users) since their solution provides a general Data Type Definition (DTD) as opposed to a specific one for each transaction type. Furthermore, it does not provide a translation for all of the transaction types for each of the EDI message standards.

Therefore, there is a need for a product that translates data from an EDI format to an XML format, and from an XML format to an EDI format, without manual complex mapping efforts sometimes associated with the transformation of data between disparate formats.

One skilled in the art would recognize that XML is a set of rules and guidelines for designing text formats for such data in a way that produces files that are more easily read by computers as well as humans. XML makes use of tags only to delimit data and leaves the interpretation of the data completely to the application that reads it. It is a simplified subset of the Standard Generalized Markup Language (SGML) which provides a file format for representing data, a schema for describing data structures, and a mechanism for extending and annotating Hyper Text Markup Language (HTML) with semantic information.

XML is important because it removes two constraints. First, it removes the dependence on a single, inflexible document type HTML. Secondly, it removes the complexity of full SGML, whose syntax allows many powerful but hard-to-program options. XML simplifies the levels of optionality in SGML and allows the development of user-defined document types on the web.

One skilled in the art would also recognize that the term EDI refers to the set of messages developed for business-to-business communication of electronic data. It works by providing a collection of standard message formats and element dictionaries for businesses to exchange data via any electronic messaging service, and is characterized by standardized electronic formats for exchanging business data. EDI is used in electronic commerce for the exchange of documents between trading partners in a transaction, wherein a trading partner is any device or component that a user may exchange EDI with, or interact with.

The basic unit of information in an EDI message is a data element. An example of an EDI message is an invoice. Each item in the EDI invoice will be representative of a data element, which is a basic unit of information in an EDI message. Each data element may represent a singular fact, such as a price, product, model number, and so forth. This string of data elements may be grouped together, and this string of elements is called a data segment. There are several data segments per message, each having its own use. Each data segment is used for defining a specific item. In addition, an EDI message generally includes addressing information specific to a trading partner.

A DTD defines the building blocks of an XML document. A DTD also defines the structure with a list of elements, and can be declared internally in an XML document or as a reusable external reference. An XML DTD defines the elements in the XML data in a document and the order of the elements.

One skilled in the art would recognize that XML DTDs can be developed by various different bodies for different reasons. For example, an international standard body may develop standardized sets of interchangeable data, an industry association may develop agreed procedures for interchanging messages between their members, a member of a multilateral agreement may need to share information, a company may need to supply information to their suppliers or customers, or a company desires to obtain information in a known format from their suppliers or customers.

Figure 2:
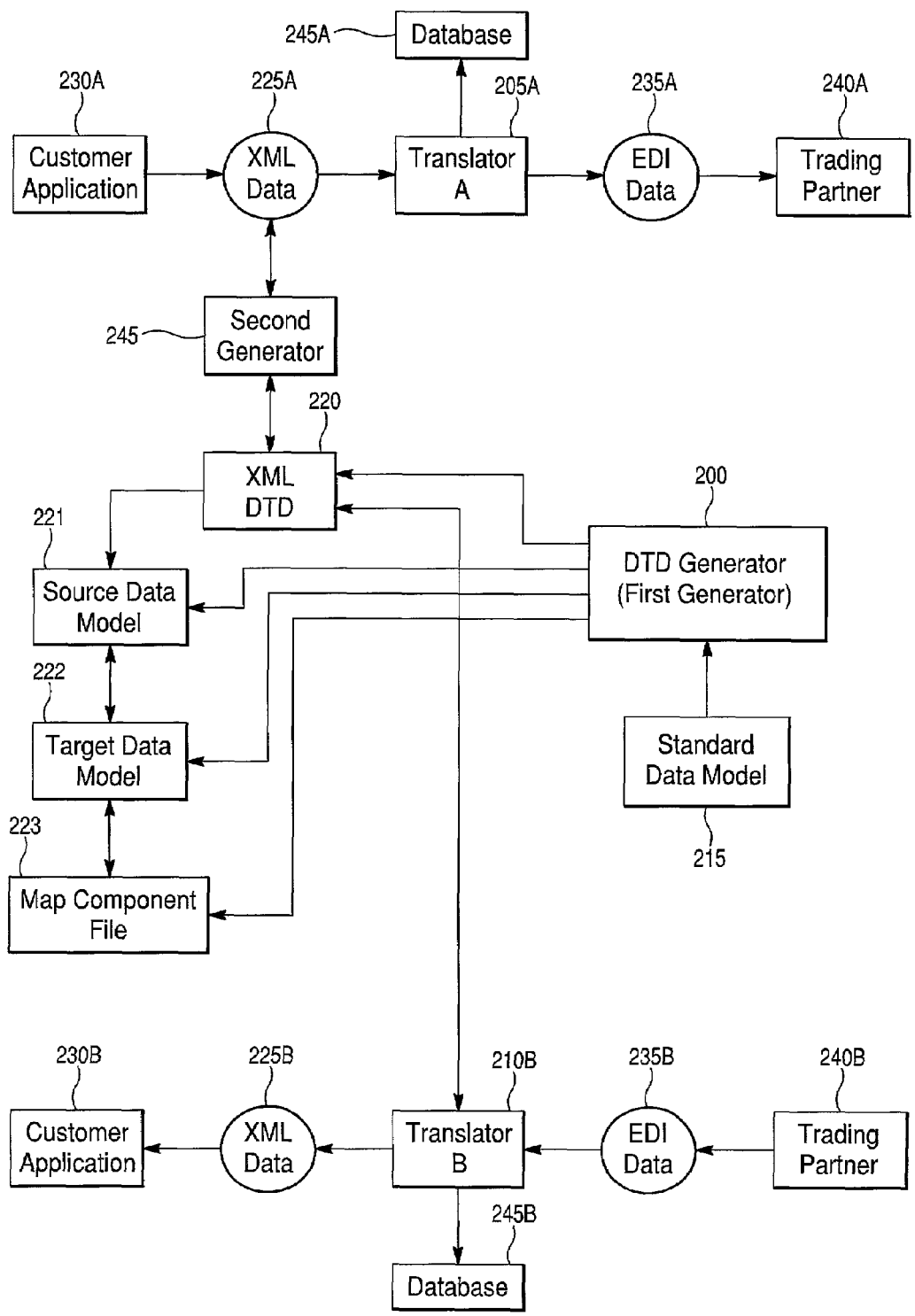
FIG. 2 is a block diagram showing the system components of a preferred embodiment of the present invention.

FIG. 2 illustrates the components of a preferred embodiment of the present invention. One skilled in the art would recognize other variations, modifications, and alternatives. The system provided by the present invention allows automatic translation of EDI data to or from a self-describing markup language format, such as XML. The EDI data may be in various EDI public standard message formats including, but not limited to, ANSI X12 and UN EDIFACT.

FIG. 2 illustrates an example of outbound processing designated by capital A's and an example of inbound processing designated by capital B's. The outbound processing is representative of the generation of an EDI document from XML Data, while the inbound processing is representative of the generation of XML data from an EDI document.

In the outbound process, EDI documents are automatically generated by receiving a standard data model 215 comprising EDI related data, generating an XML DTD 220 corresponding to each transaction of the EDI related data, generating XML data 225A using the XML DTD 220 corresponding to an EDI transaction and corresponding application data related to EDI, and automatically generating an EDI document based on the XML data 225A.

In the inbound process, XML data 225B is generated from received EDI data 235B by receiving EDI data 235B from a Trading Partner 240B, retrieving an XML DTD 220 corresponding to a transaction type of received EDI data 235B, and automatically generating XML data 225B based on the received EDI data 235B and the XML DTD 220.

A standard data model 215 is provided to the user as a pre-built structure, wherein the user only has to input rules for the purpose of mapping. The standard data model 215 contains all data elements required for an EDI transaction and structures to read in and write out EDI data, wherein the EDI data preferably comprises elements and segments. Each data element may represent a singular fact, such as a price or a model number. These data elements may be used in an EDI transaction, such as an invoice.

The DTD Generator (first generator) 200 generates four separate items: an XML DTD 220; a source data model with rules 221; a target data model with rules 222; and a map component file 223. The XML DTD 220 defines each element and each segment. The rules included with the two data models map the data from one model to the other. The source data model 221 reads in data in a first format and the target data model 222 writes out the data in a second format based on the XML DTD 220 that was created from the standard data model 215.

The source data model 221 is similar to a map. It is a structure of data model items for each segment and each element within the data. Data is received on the source side, wherein the source data model 221 has a structure built in it to read in each of the elements in the data. The rules take that data and assign them to arrays and store them in memory for all the data.

The map component file 223 is a file that is generated by the DTD Generator 200. The map component file 223 defines two access models and two data models. The access models comprise one source access model, and one target access model. These two access models are not generated by the DTD Generator 200, rather, they are provided with the translation software.

A second generator 245 generates XML Data 225A based on the XML DTD 220 generated by the DTD Generator 200.

The translation software in blocks 205A and 210B use data models to translate data from one format to another format. These models define both the input and output structures and the rules for moving the input data to the output. Data models representing XML syntax are considerably more complex than data models representing most other public standards, because the complexity is a result of the larger number of data model items and increased number of hierarchical levels to properly represent and process the XML syntax. Working with these data model structures requires significantly more user effort to define an environment with mapping rules.

In the target data model 222, the data model items are present. When a data model item needs a value or needs data to be output for that specific item, it references the array in memory by name and assigns the data from the memory array to the data model item. Finally, when all the data model items have been mapped with their appropriate data, each of the target data model items are written out to the output file.

The assignments are implemented by the user, wherein the DTD Generator 200 simply creates the structure. The user maps the data that the user wants to be mapped. This mapping is done through the translation software, and allows the user to drag and drop an item from the source model corresponding to the target model.

A Customer Application 230 generates data that is usable in an EDI document. The data could be, for example, an invoice, an inventory, a sale, or a price. A Trading Partner 240 is any device or component that the user exchanges EDI with or interacts with. The Trading Partner Profile information is stored in Database 245A and Database 245B which the Translator A 205A and/or Translator B 210B, access during a translation process, respectively.

In the outbound process, the Customer Application 230A outputs data based on the XML DTD 220 generated in the DTD Generator 200. The user programs the application to output the data correctly, and a DTD template is provided. The second generator 245 generates XML Data 225A, which starts a translation within a software tool.

There are many ways to invoke a translation. One way is to run the translation from a command line or scheduler. The scheduler can start a translation at any time, day, etc. A script may also be written within the scheduler, that looks for input data in a certain directory and if found, invokes a translation.

Once the Customer Application 230A has output proper XML Data 225A based on the generated XML DTD 220, the user then invokes the translation, which can be set up to be run automatically, or may be manually run.

Translator A 205A translates data from the XML format to the EDI format. The source data model 221 created by the DTD Generator 200 reads in data, maps it to the target data model 222 and outputs the data in the format of the target model. From the Translator A 205A, EDI Data 235A is output for transmission to a Trading Partner 240A.

In the inbound process, as shown in FIG. 2, EDI Data 235B is received from a Trading Partner 240B. In Translator B 210B, the EDI Data 235B goes through the source data model 221 and is mapped over to the target data model 222 and outputs XML Data 225B based on the XML DTD 220 generated from the DTD Generator 200. Translator B 210B accesses the Database 245B for information about the Trading Partner 240B. Then, the XML Data 225B is transmitted to the Customer Application 230B. If the EDI Data 235B being received does not have a trading partner profile already set up, the data would be bypassed with an error stating that the trading partner profile is missing. The user would then create the trading partner profile and re-run the translation. Optionally, the translating software has a feature that can be selected when a new Trading Partner 240B is sending out data. During translation, the trading partner profile would be created using data from the EDI Data 235B and from the trading partner profile template.

One skilled in the art would recognize that Translator A and Translator B can be implemented as a single software implementation that uses two different sessions of translation. Translator A reads in data in the XML format and writes out the data in the EDI format, while Translator B reads in data in the EDI format and writes out the data in the XML format.

A manually entered or other input indicating the direction of the translation would allow the translator to be used in both directions. The input of direction would specify whether the transformation was going from XML format to EDI format or from EDI format to XML format.

Figure 3:
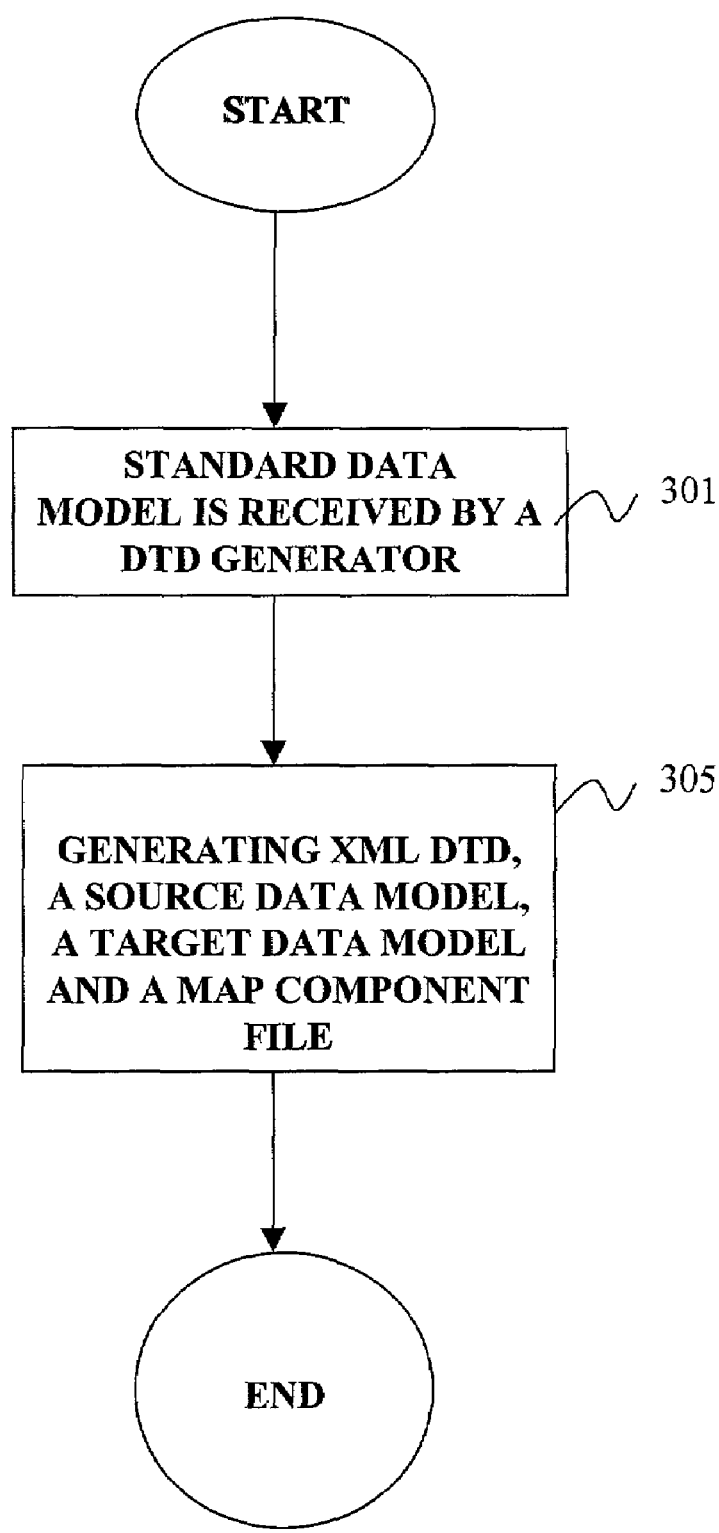
FIG. 3 is a flow chart illustrating a preferred embodiment of the method steps of DTD generation according to a preferred embodiment of the present invention.
Figure 4:
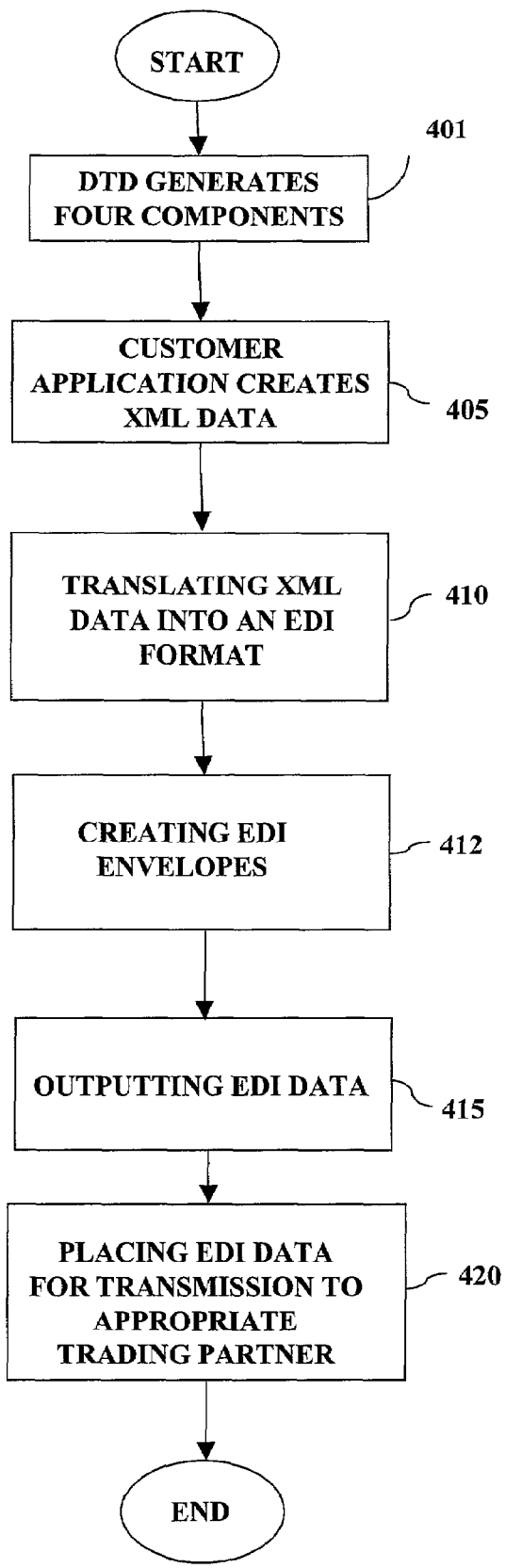
FIG. 4 is a flow chart illustrating a preferred embodiment of the method steps of an outbound processing according to a preferred embodiment of the present invention.
Figure 5:
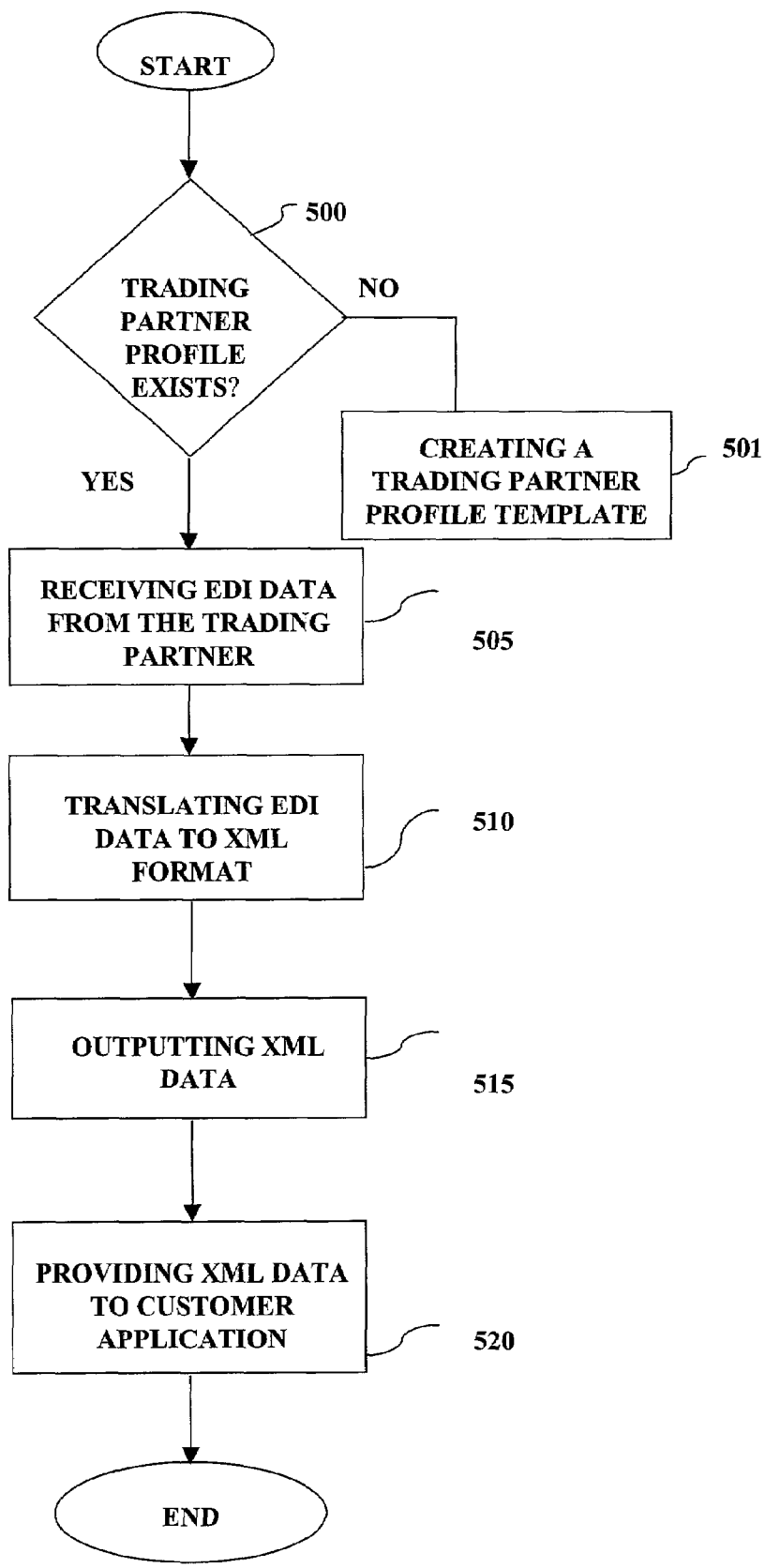
FIG. 5 is a flow chart illustrating a preferred embodiment of the method steps of an inbound processing according to a preferred embodiment of the present invention.

FIGS. 3-5 describe the operation of the present invention as discussed, for example, with respect to FIG. 2. The operation can be divided into three sections, DTD generation, inbound processing and outbound processing, for conveniences of understanding.

FIG. 3 illustrates the process of DTD generation. A standard data model 215 is received by the DTD Generator 200 in step 301. The standard data model 215 contains all the elements needed for an EDI transaction. Elements may be singular facts such as a price or a product number of an EDI transaction, such as an invoice.

In DTD generation, an XML DTD 220 is generated from the inputted standard data model 215, a source data model 221, a target data model 222, and a map component file 223, as in step 305. Manually input parameters are also passed into the DTD Generator 200.

For a particular EDI message, for example, an Invoice, the user would invoke the DTD Generator 200 once, which would create the models needed to translate the data. Then, these models could be used for all Invoices received from that Trading Partner 240. The DTD Generator 200 would thus preferably only be used that one time. The segment and element names from the standard data model 215 are used as the element names in the XML DTD 220. The description of these elements is defined as optional attributes. All segments and elements are defined in the DTD that are defined in the standard data model 215 generated in block 305, and the user's application will adhere to this generated DTD for both outbound processing (FIG. 4) and inbound processing (FIG. 5). The source data model 221 and the target data model 222 that are generated contain mapping rules. The data parsed in the source data model 221 is assigned to variables and stored in a memory array. When target data model 222 processing takes place, the variables are referenced for their data and assigned to the data model items in the target data model 222.

During DTD Generation, there is a minimal amount of user input. In one aspect of the present invention, the user manually enters the standard of EDI, a version of the standard, the transaction set and the direction (e.g. from EDI to XML (inbound) or from XML to EDI (outbound)). Therefore, four files are generated: the map component file, a source data model, a target data model and an XML DTD as follows.

If the user selects an OUTBOUND direction, meaning that the user is receiving incoming XML data which is to be converted to an EDI document, then the process would generate:

A Source XML Model created using the following rules of creation:
The XML Model is of variable length and is representative of the XML file.

Elements that have children become tags, and elements without children are Defining items within the Tags. Parent elements become the Tag. The children elements become the Defining Items with the record.

Elements that repeat become Tags w/multiple occurrences.

Elements with the ?, question mark, are given properties of "optional". In other words the element marked with ? can exist in the XML message but does not have to. If the element exists, it can only occur once, not multiple times. This is called optional.

Elements with the +, plus sign, are given properties of "mandatory". In other words the element marked with + must have at least one occurrence in the XML message. These elements can have multiple occurrences with no upper limit, but no less than 1 occurrence. This is called mandatory.

Elements with the *, asterisk, are given properties of "optional". In other words, the element marked with * may have zero or more occurrences. These elements can have multiple occurrences with no upper limit and no lower limit. This is optional.

Since the XML DTD, and XML message do not contain any data type properties, all data fields will be created as alphanumeric fields. Since the XML schema does have data type properties, those properties specified in the XML schema will be used to populate the data model item properties in the source or target data models.

Since there are no data type properties in the XML DTD and XML message, the min & max length of the data will be defined as between 0 and 4092. The actual length of the data will determine the physical output.

If the Source model is an XML model, then the Target model is a Target EDI Model created by the following rules:

The EDI Model is of a fixed length and is representative of the standard of the EDI file.

Segments that have elements become tags, and segments without elements are Defining items within the Tags. Parent segments become the Tag. The elements become the Defining Items with the record.

Segments that repeat become Tags w/multiple occurrences.

Elements with the ?, question mark, are given properties of "optional". In other words the segments marked with ? can exist in the XML message but does not have to. If the element exists, it can only occur once, not multiple times. This is called optional.

Elements with the +, plus sign, are given properties of "mandatory". In other words the element marked with + must have at least one occurrence in the XML message. These elements can have multiple occurrences with no upper limit, but no less than 1 occurrence. This is called mandatory.

Elements with the *, asterisk, are given properties of "optional". In other words, the element marked with * may have zero or more occurrences. These elements can have multiple occurrences with no upper limit and no lower limit. This is optional.

Since the XML DTD, and XML message do not contain any data type properties, all data fields will be created as alphanumeric fields. Since the XML schema does have data type properties, those properties specified in the XML schema will be used to populate the data model item properties in the source or target data models.

Since there are no data type properties in the XML DTD and XML message, the min & max length of the data will be defined as specified per public standard of EDI specified by user input during DTD Generation.

If the user selects INBOUND, meaning that the user is receiving incoming EDI data which is to be converted to XML data, then the process would generate:

A Source EDI Model created using the following rules of creation:

The EDI Model is of a fixed length and is representative of the standard of the EDI file.

Segments that have elements become tags, and segments without elements are Defining items within the Tags. Parent segments become the Tag. The elements become the Defining Items with the record.

Segments that repeat become Tags w/multiple occurrences.

Elements with the ?, question mark, are given properties of "optional". In other words the elements marked with ? can exist in the XML message but does not have to. If the element exists, it can only occur once, not multiple times. This is called optional.

Elements with the +, plus sign, are given properties of "mandatory". In other words the element marked with + must have at least one occurrence in the XML message. These elements can have multiple occurrences with no upper limit, but no less than 1 occurrence. This is called mandatory.

Elements with the *, asterisk, are given properties of "optional". In other words, the element marked with * may have zero or more occurrences. These elements can have multiple occurrences with no upper limit and no lower limit. This is optional.

Since the XML DTD, and XML message do not contain any data type properties, all data fields will be created as alphanumeric fields. Since the XML schema does have data type properties, those properties specified in the XML schema will be used to populate the data model item properties in the source or target data models.

Since there are no data type properties in the XML DTD and XML message, the min & max length of the data will be defined as specified per public standard of EDI specified by user input during DTD Generation.

A Target XML Model created using the following rules of creation:

The XML Model is of variable length and is representative of the XML file.

Elements that have children become tags, and elements without children are Defining items within the Tags. Parent elements become the Tag. The children elements become the Defining Items with the record.

Elements that repeat become Tags w/multiple occurrences.

Elements with the ?, question mark, are given properties of "optional". In other words the element marked with ? can exist in the XML message but does not have to. If the element exists, it can only occur once, not multiple times. This is called optional.

Elements with the +, plus sign, are given properties of "mandatory". In other words the element marked with + must have at least one occurrence in the XML message. These elements can have multiple occurrences with no upper limit, but no less than 1 occurrence. This is call Elements with the *, asterisk, are given properties of "optional". In other words, the element marked with * may have zero or more occurrences. These elements can have multiple occurrences with no upper limit and no lower limit. This is optional.

Since the XML DTD, and XML message do not contain any data type properties, all data fields will be created as alphanumeric fields. Since the XML schema does have data type properties, those properties specified in the XML schema will be used to populate the data model item properties in the source or target data models.

Since there are no data type properties in the XML DTD and XML message, the min & max length of the data will be defined as between 0 and 4092. The actual length of the data will determine the physical outputted mandatory.

FIG. 4 illustrates the outbound processing of the generation of EDI documents. A standard data model 215, containing EDI related data, is received by the DTD Generator 200. In step 401, the DTD Generator 200 generates XML DTD 220, a source data model 221 with rules, a target data model 222 with rules, and a map component file 223, as discussed earlier herein with respect to FIG. 3.

In step 405, the customer's application 230A creates XML Data 225A that corresponds to the XML DTD 220, generated in the DTD Generator 200 for the version and message being traded. The version is usually manually inputted during DTD Generation. The first element of an XML document generally contains the necessary data to locate the Trading Partner Profile.

In step 410, a translation is invoked by passing the XML Data 225A as input to a Translator A 205A, which validates and parses the XML Data 225A, and converts the data into an EDI format. EDI data is saved to a file, for example, a temporary file. If a trading partner profile is not set up prior to running the translation, then the translation would fail in the source data model 221, since that is where the information about the Trading Partner 240A is located based on the data passed in the XML Data 225A. The trading partner profile tells the translation which target model to use. The software tool system models then create the EDI envelopes and wraps them around the XML Data 225, as in step 412. In step 415, EDI Data 235A is output.

In step 420, EDI Data 235A is placed in the appropriate directory for transmission to the appropriate Trading Partner 240A.

The process of creating the EDI envelopes and wrapping them in XML data, as in step 412, can be compared to sending an invoice to two different plants, A and B, of the same company, using traditional postal mail. One invoice is placed in an envelope and addressed to plant A. The second invoice is placed in a second envelope and is addressed to plant B. Both of these envelopes are then placed in a large envelope which is addressed to the company in general. The example of traditional postal mail can be directly related to EDI. Within the data, there is an Interchange envelope, which is the large envelope in the previous example. This Interchange envelope contains the general address of the company and your address. These addresses can by any number of values such as DUNS numbers, phone numbers, etc. There is also a Functional Group envelope which defines the plants, or the small envelopes. This contains addresses for each separate plant. The message envelope defines the document being sent.

If the EDI version is X12, then the Interchange envelope would be the ISA segment, the Functional Group envelope would be the GS segment, and the message envelope would be the ST segment. The data would looks as follows:

ISA
GS
ST
Actual message segments (Invoice, PO, etc.)
SE—ends the ST
GE—ends the GS
IEA—ends the ISA FIG. 5 illustrates the inbound processing of EDI documents being received. In step 500, a determination is made on whether or not a trading partner profile exists. If no trading partner profile exists, then the user creates a trading partner profile template for inbound EDI data 235B, as in block 501.

If a Trading Partner Profile does not exist, in step 501, a Trading Partner Profile template is created using the template based on, for example, ID's sent in the EDI Data 235B envelope segments. The system models then read the trailing EDI envelopes and continue this process for each message within the input file. The EDI envelopes contain information about the trading partner.

If a trading partner profile does exist, then step 505, a Trading Partner 240B provides EDI Data 235B. In block 510, a translation within the software tool is invoked. The input into Translator B 210B is the EDI Data 235B. System models within Translator B access the Trading Partner Profile Database 245B to discover the existence or non-existence of a Trading Partner Profile.

In step 515, the XML Data from the translation step is outputted. In step 520, the output XML Data 225B will be committed to an appropriate directory for the Customer Application 230B.

This invention automates the creation of XML and EDI data models with minimal user involvement. In one aspect of the present invention, the user only manually enters the EDI standard (e.g. X12 or EDIFACT), a version of the standard (e.g. 4010), the transaction set (e.g. 850 Purchase Order) and the direction (e.g. from EDI to XML or from XML to EDI). This manual entry of parameters step is done during the generation of XML DTD 220, the source data model 221, the target data model 222, and map component file 223 generated by the DTD Generator 200. The DTD Generator 200 is used prior to running any translations, because the products of the DTD Generator 200 are used during translation.

An advantage of this invention is that data in the EDI format is translated to data in the XML format, and/or data in the XML format is translated to data in the EDI format automatically, easily and quickly. A benefit is that the user does not have to spend significant time creating the complex maps that are required, for example, in other prior art systems. This approach speeds up the process of developing XML/EDI maps and getting them into production use. Another important benefit of this invention is that businesses are able to quickly integrate their EDI applications with newer XML applications related to EDI.

Furthermore, the present invention provides for translation of all of the transaction types for each of the message standards of EDI types. Also, the present invention provides a humanly readable naming convention for the XML tags contained within the documents. The data models contain names for each of the elements, such as BEG_01, BEG_02, etc. One skilled in the art would recognize the elements based on its name. These names of the elements are the same names that will be used in the XML DTD 220. If the name is not descriptive enough for identification, the description can be optionally used as an attribute so an English description of that element is seen. This is important, because IT professionals are manually looking at DTD descriptions in order to get their applications to produce and read XML. Tag names that connote an intuitive meaning provide more value than ones that require looking up in a reference or table to determine the meaning. Tag names also provide EDI references therein so that in the event that a human is trying to determine which EDI segment or elements are involved with a particular data item, they could easily do so by looking at the tag name.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A computer implemented method of automatically generating Electronic Data Interchange (EDI) documents by a trading partner comprising the steps of:

receiving, by the trading partner, a standard data model comprising EDI related data for a plurality of transactions;

generating from the standard data model, by the trading partner, data definitions for a self describing markup language corresponding to each transaction of the EDI related data;

generating self-describing markup language data using a data definition from the generated data definitions for the self-describing markup language corresponding to an EDI transaction and corresponding application data related to EDI; and automatically generating, by the trading partner, an EDI document based on the self-describing markup language data, wherein the step of generating data definitions further comprises, for each transaction, generating data definitions for the self-describing markup language, a separate data model to read in data, a separate data model to read out data, and a map component file, wherein the step of generating data definitions comprises receiving user input of an EDI standard, a version of the standard, a transaction set, and mapping rules for the standard data model.

2. A system for automatically generating Electronic Data Interchange (EDI) documents by a trading partner, the system comprising:

a standard data model comprising EDI related data of a plurality of transactions;

a computer implemented first generator that generates, from the standard data model, data definitions for a self-describing markup language corresponding to each transaction of the EDI related data;

a computer implemented second generator that generates self-describing markup language data using a data definition for the self-describing markup language corresponding to an EDI transaction and corresponding application data related to the EDI; and a computer implemented translator that automatically generates an EDI document based on the self-describing mark up language data, wherein the first generator generates, for each of the plurality of transactions, data definitions for the self-describing markup language, a separate data model to read in data, a separate data model to read out data, and a map component file, wherein the first generator further comprises a user interface for user input of an EDI standard, a version of the standard, and a transaction set prior to generating the EDI document.

3. Program code on a computer readable medium, that is executable by a computer for generating Electronic Data Interchange (EDI) documents by a trading partner, the program code configured to cause the computer to perform the following steps:

receiving, by the trading partner, a standard data model comprising EDI related data for a plurality of transactions;

generating from the standard data model, by the trading partner, data definitions for a self-describing markup language corresponding to each transaction of the EDI related data;

generating self-describing markup language data using a data definition from the generated data definitions for the self-describing markup language corresponding to an EDI transaction and corresponding application data related to EDI; and automatically generating, by the trading partner, an EDI document based on the self-describing markup language data, wherein the step of generating data definitions further comprises, for each transaction, generating data definitions for the self-describing markup language, a separate data model to read in data, a separate data model to read out data, and a map component file, wherein the step of generating data definitions comprises receiving user input of an EDI standard, a version of the standard, a transaction, and mapping rules for the standard data model.

4. A computer implemented method of automatically generating Electronic Data Interchange (EDI) documents, by a trading partner, comprising the steps of:

receiving, by the trading partner, a standard data model containing EDI related data for a plurality of transactions;

receiving a manual entry of parameters related to an EDI document format;

generating from the standard data model and the manual entry of parameters, by the trading partner, data definitions for the self-describing markup language corresponding to each transaction of the EDI related data and the received manually entered parameters;

generating self-describing markup language data using the data definition for the self-describing markup language corresponding to an EDI transaction and corresponding application data related to EDI; and automatically generating, by the trading partner, an EDI document based on the self-describing markup language data, wherein the step of generating data definitions further comprises, for each transaction, generating data definitions for the self-describing markup language, a separate data model for read in data, a separate data model for read out data, and a map component file, wherein the step of receiving a manual entry of parameters comprises receiving user input of an EDI standard, a version of the standard, a transaction set, a direction, and mapping rules for the standard data model.

5. A computer implemented method of automatically generating data in a self-describing markup language format from received EDI data, comprising the steps of:
- receiving user input of an EDI standard, a version of the standard, and a transaction set in generating the self-describing markup language data definition, and mapping rules for the standard data model;
- receiving EDI data from a component;
- retrieving a self-describing markup language data definition corresponding to a transaction type of received EDI data; and
- automatically generating self-describing markup language data based on the received EDI data and the self-describing markup language data definition,
- prior to said receiving step, generating data definitions corresponding to each transaction type from a standard data model of EDI related data,
- wherein the generating data definitions step comprises, for each transaction, a data definition for the self-describing mark up language, a separate EDI data model to read in data, a separate self-describing mark up language data model to read-out data, and a map component file.

6. A computer program product for automatically generating data in a self-describing markup language format from received EDI data, the computer program product embodied in computer readable media executable by a computer, the computer program product comprising:
- a component for transmitting EDI data;
- a translator that receives a self-describing markup language data definition corresponding to a transaction type of received EDI data;
- wherein the translator that automatically generates the self-describing markup language data based on the received EDI data and the self-describing markup language data definitions,
- wherein the translator receives the self-describing markup language data definition generated by a generator from a standard data model comprising EDI related data for a plurality of transactions, the data definition comprising, for each transaction, a data definition for the self-describing mark up language, a separate EDI data model to read in data, a separate self-describing mark up language data model to read-out data, and a map component file,
- wherein the generator further comprises a user interface for user input of an EDI standard, a version of the standard, and a transaction set prior to generating the self-describing markup language format.

7. A program code on a computer readable medium that is executable by a computer for automatically generating data in a self-describing markup language data from received EDI data, the program code configured to cause the computer to perform the following steps:
- receiving user input of an EDI standard, a version of the standard, a transaction set in generating the self-describing markup language data definition, and mapping rules for the standard data model;
- receiving EDI data from a component;
- retrieving a self-describing markup language data definition corresponding to a transaction type of received EDI data; and
- automatically generating self-describing markup language data based on the received EDI data and the self-describing markup language data definition,
- prior to said receiving step, generating data definitions corresponding to each transaction type from a standard data model comprising EDI related data for a plurality of transactions,
- wherein the generating data definitions step comprises, for each transaction, a data definition for the self-describing mark up language, a separate EDI data model to read in data, a separate self-describing mark up language data model to read-out data, and a map component file.

* * * * *